May 25, 1965

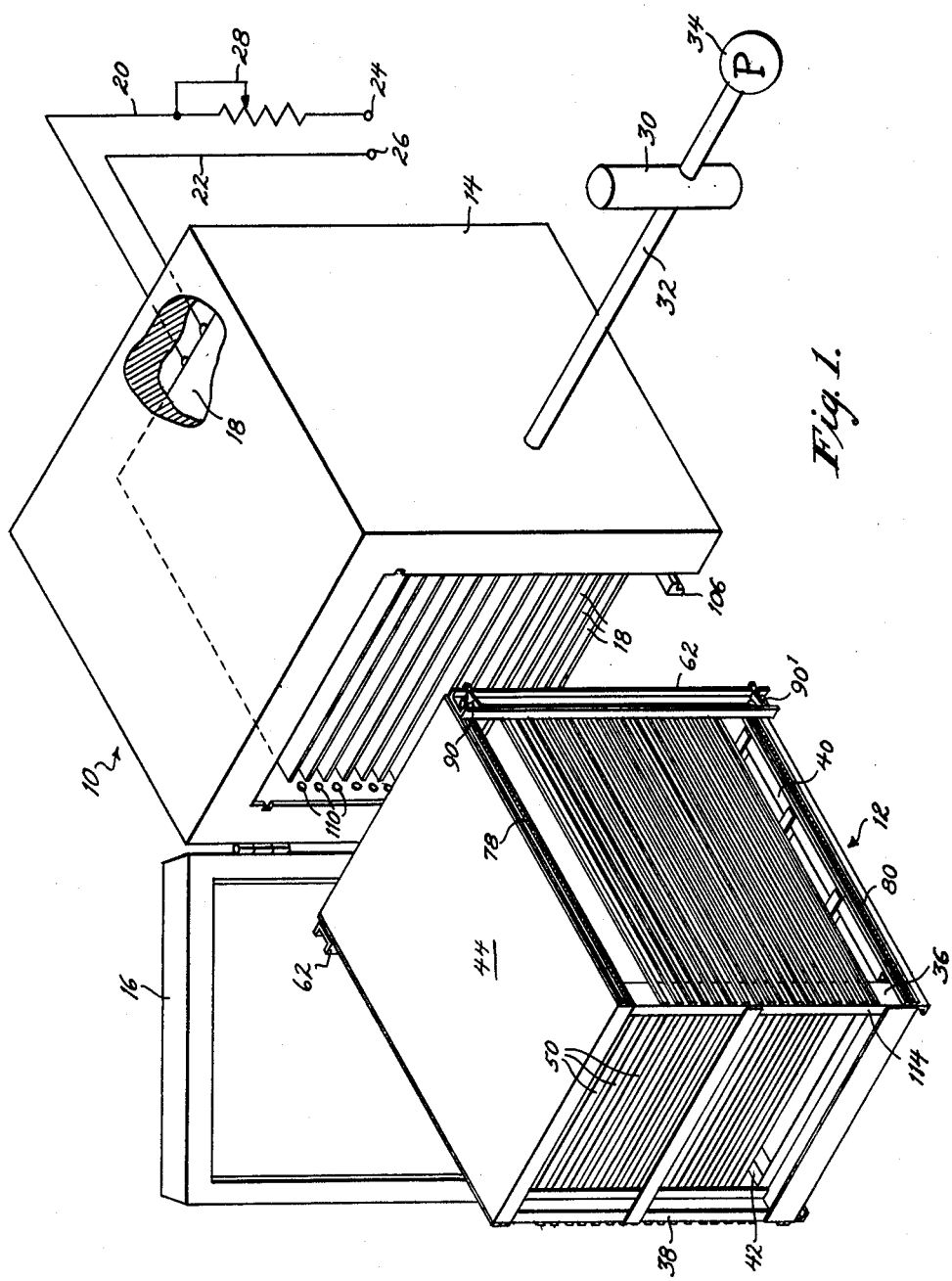

R. G. FRANK 3,184,862

APPARATUS FOR DRYING COMPRISING A REMOVABLE
CART WITH TRAY-SUPPORTING SHELVES

Filed Dec. 6, 1961

INVENTOR.
RAYMOND G. FRANK
BY
Arthur H. Seidel
ATTORNEY.

May 25, 1965  R. G. FRANK  3,184,862
APPARATUS FOR DRYING COMPRISING A REMOVABLE
CART WITH TRAY-SUPPORTING SHELVES
Filed Dec. 6, 1961  3 Sheets-Sheet 3

INVENTOR.
RAYMOND G. FRANK
BY
Arthur H. Seidel
ATTORNEY.

United States Patent Office 3,184,862
Patented May 25, 1965

3,184,862
APPARATUS FOR DRYING COMPRISING A REMOVABLE CART WITH TRAY-SUPPORTING SHELVES
Raymond G. Frank, Ambler, Pa., assignor, by mesne assignments, to Pennsalt Chemicals Corporation, Philadelphia, Pa., a corporation of Pennsylvania
Filed Dec. 6, 1961, Ser. No. 157,427
6 Claims. (Cl. 34—87)

This invention relates to a material handling apparatus, and more particularly to a material handling apparatus in the nature of a movable cart adapted to be utilized in conjunction with an enclosure having a plurality of shelves therein.

Numerous types of enclosures such as driers, freeze drying equipment, freezers, etc. are provided with a plurality of horizontally disposed shelves one above the other on which articles are adapted to be supported for a predetermined period of time. Equipment of this nature is generally provided with a movable door in order to provide selective access to the articles disposed on the shelves or supported by the shelves. Heretofore, it has been conventional for an operator to manually position trays of articles on the individual shelves in the particular piece of equipment. Thus, in large establishments it was necessary to employ a large number of personnel whose duty consisted of placing trays of articles on shelves within an enclosure and after a predetermined period of time removing the same.

It will be appreciated that the above mentioned apparatus and method of using the same is time consuming. The material handling apparatus of the present invention is in the nature of a movable cart which may be loaded with trays at one point and manually or mechanically moved to the enclosure where it is desired to temporarily position the trays of articles for a predetermined period of time. The cart of the present invention is structurally interrelated in a manner so that the entire cart may be inserted into an enclosure having a plurality of horizontally disposed shelves therein.

In order for the cart of the present invention to be capable of being positioned so as to be entirely disposed within an enclosure having horizontally disposed shelves, the tray supports on the cart are cantilever beams having their free ends adapted to be maintained in horizontally spaced relation by means of a reciprocable support channel. Means are provided so that the support channel reciprocates along the length of the cart as the cart enters the enclosure. When the cart has entered the enclosure, a latching means automatically secures the support channel with respect to the enclosure. When the cart is removed from the enclosure, the support channel reciprocates along the length of the cart. Thereafter, the latching member is automatically disengaged with respect to the enclosure.

The material handling apparatus of the present invention is particularly adaptable for use with freeze drying equipment. In freeze drying equipment, the horizontally disposed shelves are a source of radiant heat which causes sublimation of the ice in the previously frozen articles disposed within the trays. However, the same cart may be utilized with the freezer apparatus which freezes the articles prior to placement of the articles within the drying apparatus. Accordingly, it will be noted that the cart of the present invention eliminates the necessity for unloading and loading the cart with respect to the freezer apparatus or drying apparatus.

As illustrated, the material handling apparatus of the present invention is provided with horizontally disposed tray supports and is adapted to cooperate with an enclosure having horizontally disposed shelves. However, the apparatus of the present invention could equally be of the type having vertically disposed supports or elements which are adapted to be maintained between vertical partitions within an enclosure for a predetermined period of time. Thus, the vertically disposed supports or elements could be inserted between vertical partitions in a painting booth or the like. Alternatively, the vertical partitions in the enclosure could be a portion of an apparatus for anodizing one surface of a mirror.

It is an object of the present invention to provide a material handling apparatus which is movable and capable of being inserted into an enclosure in a manner whereby spaced parallel elements on the material handling apparatus will be disposed between spaced parallel partitions which are parallel to the elements.

It is another object of the present invention to provide a material handling apparatus in the nature of a movable cart having horizontally disposed trays adapted to be inserted between horizontally disposed partitions in an enclosure, with said cart likewise being capable of entering said enclosure.

It is a still further object of the present invention to provide a novel material handling apparatus in the nature of a movable cart having a plurality of parallel cantilever beams for supporting elements in spaced parallel planes, and a movable support channel traversing the beams for supporting the free end of said beams.

It is yet another object of the present invention to provide a freeze drying apparatus having a plurality of horizontally disposed heater shelves therein and a movable cart which supports trays of articles and is capable of physically entering said apparatus in a manner so that the trays are disposed intermediate the shelves.

It is still another object of the present invention to provide a material handling apparatus adapted to be utilized with an enclosure having a plurality of spaced parallel shelves therein so that trays of articles on the apparatus need not be physically transferred from the apparatus to the shelves.

Other objects will appear hereinafter.

For the purpose of illustrating the invention there is shown in the drawings a form which presently preferred; it being understood, however, that this invention is not limited to the precise arrangements and instrumentalities shown.

FIGURE 1 is a perspective view of the cart of the present invention juxtaposed to a drying chamber.

Figure 3:
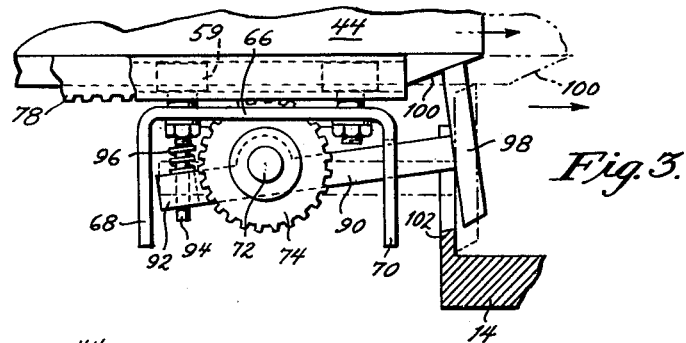
FIGURE 3 is a top plan view of the support channel shown in FIGURE 2.

Referring to the drawings in detail, wherein like numerals indicate like elements, there is shown in FIGURE 1 an enclosure designated generally as 10 and a material handling cart designated generally as 12. The cart 12 is adapted to be disposed within the enclosure 10 as will be made clear hereinafter.

The enclosure 10 may, for example, be a freeze drying chamber comprising a housing 14 having an access opening selectively blocked by means of a pivotably mounted door 16. The housing 14 is provided with a plurality of horizontally disposed heater shelves 18. Each of the shelves 18 are electrically connected to the wires 20 and 22 which extend to terminals 24 and 26, respectively. The wire 20 may be provided with a rheostat 28.

During the freeze drying process, the moisture in frozen articles will be sublimated due to the radiant heat from the shelves 18. Such moisture will be removed from the housing 14 by a vacuum pump 34 communicating with a pipe 32. The pipe 32 is in communication with the interior of the housing 14. A condenser 30 is in communication with the pipe 32 between the housing 14 and the pump 34. In this manner, the outlet side of the pump 34 may communicate with the atmosphere.

The material handling cart 12 comprises a pair of upright standards 36 and 38 extending from a base having side rails 40 and 42. The cart 12 is provided with a top panel 44. The top panel 44 prevents foreign matter from being dropped into the open trays on the cart 12 and also performs other functions to be made clear hereinafter.

The standards 36 and 38 are interconnected by brace members. The standards, brace members, side rails, etc. of the frame of the cart 12 are preferably made from extruded lightweight material such as aluminum or the like. A plurality of angle supports 46 are provided on the cart 12. The supports 46 have only one end secured to the frame of the cart 12. Thus, the supports 46 are disposed in cantilever fashion in spaced horizontal planes one above the other.

Figure 4:
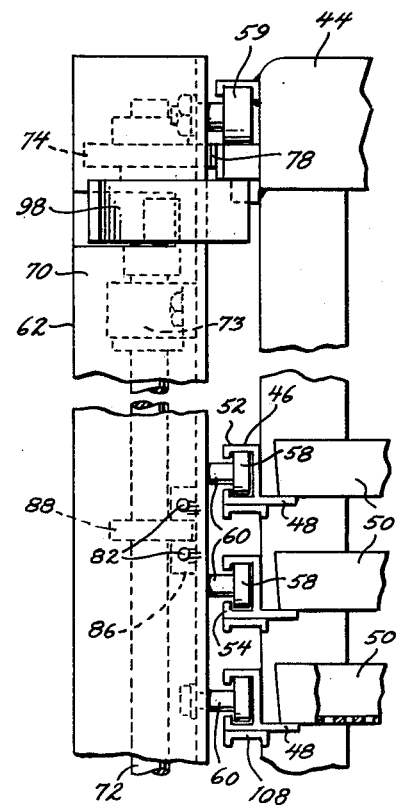
FIGURE 4 is a front elevation view of the support channel and adjacent structure.

As shown more clearly in FIGURE 4, the angle supports 46 are provided with a horizontally disposed flange 48. The flange 48 on one angle support 46 cooperates with the flange 48 on another support 46 lying in the same horizontal plane and on the opposite side of the cart to removably support trays 50. Each tray 50 is provided with a perforated bottom wall and is adapted to support articles such as food and the like. The supports 46 are also provided with horizontally disposed arms 52 and 54 on the opposite side thereof from the flange 48. Each of the arms 52 and 54 are provided with inturned ends and thus cooperate to define the C-shaped groove 56 as shown more clearly in FIGURE 9.

The grooves 56 extend for the full length of the supports 46. As shown more clearly in FIGURE 4, each of the grooves 56 receives a wheel 58 rotatably mounted on a shaft 60. The shafts 60 are secured to the base 66 of a reciprocably mounted support channel 62 by means of nuts 64.

The weight of the support channels 62 is primarily absorbed by the top and bottom wheels 59 which are supported by the top panel 44 and the bottom side rails 40, respectively.

As shown more clearly in FIGURE 3, the reciprocably mounted support channel 62 is C-shaped in transverse cross-section and includes spaced parallel arms 68 and 70 extending from the base 66. As shown more clearly in FIGURE 1, a support channel 62 is disposed on each side of the cart 12 at the free end of the supports 46. That is, the support channel 62 is illustrated in FIGURE 1 as being located at the end of the cart 12 remote from the standards 36 and 38. The support channels 62 are illustrated as being upright with respect to the supports 46. If desired, the support channels 62 may be slightly angled with respect to the longitudinal axis of the supports 46. Whatever the position of the support channel 62, means are provided to maintain the predetermined relationship in all relative positions of the support channels 62 with respect to the supports 46. For purposes of the present discussion, it will be assumed that the support channels 62 are perpendicular to the horizontal planes defined by the supports 46 on opposite sides of the cart 12. As will be made clear hereinafter, the wheels 59 enable the support channel 62 to reciprocate along the length of the supports 46.

Each of the reciprocable support channels 62 are identical. Accordingly, only one support channel need be described in detail for purposes of the present invention. In order to maintain the support channel 62 in its predetermined relationship with respect to the planes of the supports 46, a stabilizing shaft 72 is provided in an upright disposition between the arms 68 and 70. Suitable bearings 73 support the shaft 72 for rotary motion. Gears 74 and 76 are fixedly secured to the shaft 72 adjacent opposite ends thereof. The gear 74 is in meshing engagement with a rack 78 on top panel 44. Gear 76 is in meshing engagement with rack 80 on the base side rail 40.

Figure 2:
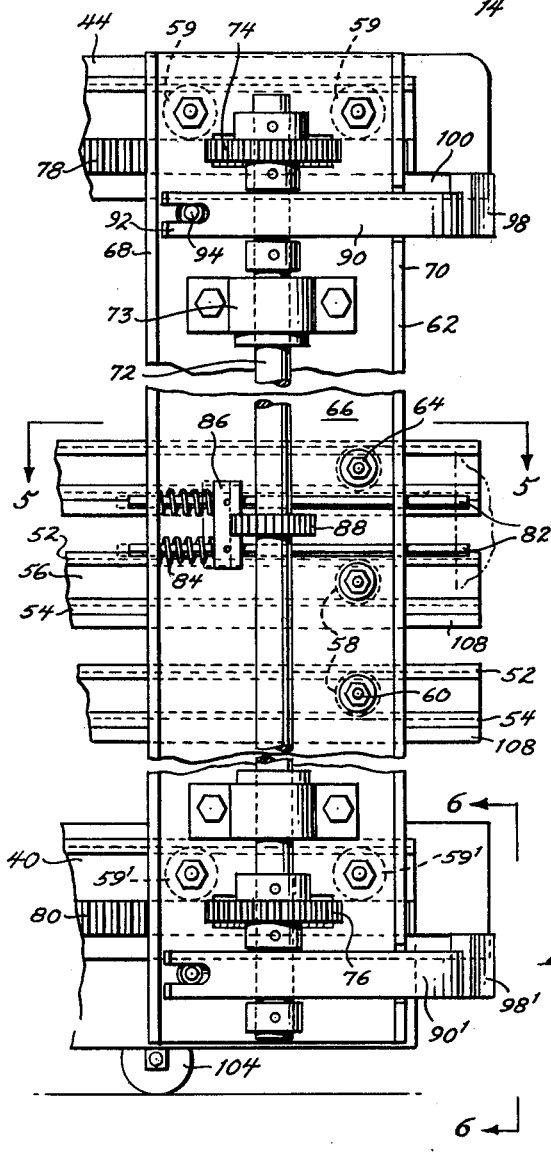
FIGURE 2 is an enlarged side elevational view of the movable support channel on one side of the cart.
Figure 5:
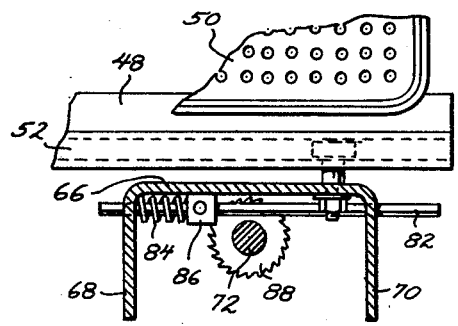
FIGURE 5 is a sectional view taken along lines 5—5 in FIGURE 2.
Figure 6:
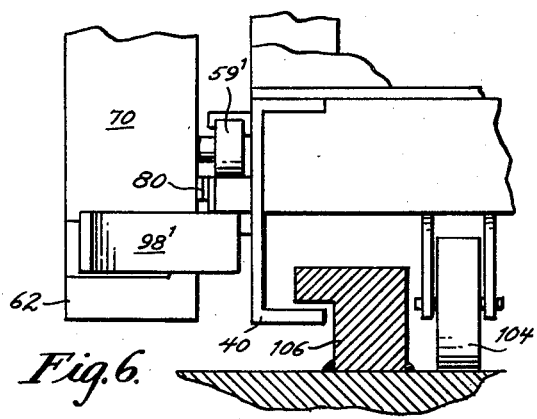
FIGURE 6 is a partial enlarged view of the bottom portion of the front of the cart taken along lines 6—6 in FIGURE 2.

As shown more clearly in FIGURES 2 and 5, a pair of plunger pins 82 extend through the arms 68 and 70 with their longitudinal axis being parallel to the longitudinal axis of the supports 46. A coil spring surrounds each plunger pin 82 and biases a pawl 86 on each pin into meshing engagement with a ratchet 88. The springs 84 extend between the arm 68 and the pawl which is fixedly secured to the plunger pins 82. The ratchet 88 is fixedly secured to the shaft 72. The pawl 86 engages the ratchet 88 so as to prevent clockwise rotation of the shaft 72 and the ratchet 88 secured thereto.

In order to latch the support channel 62 with respect to the housing 14, a latch mechanism is provided. The latch mechanism is automatically engaged when the cart 12 has entered the housing 14 for a short distance and automatically disengages as the innermost end of the cart emerges from the housing 14. The latch mechanism includes T-shaped latch members 90 and 90' disposed adjacent opposite ends of the shaft 72. The latch members 90 and 90' are identical. Accordingly, only latch member 90 will be described in detail.

As shown more clearly in FIGURE 3, the T-shaped latch member 90 includes a portion which is rotatably mounted on the shaft 72. One end 92 of the latch member 90 is provided with a clevis. A pin 94 extends between the bifurcations of the clevis. The pin 94 is fixedly secured to the base 66. A coil spring 96 surrounds the pin 94 and biases the latch member 90 in a counterclockwise direction in FIGURE 3.

The spring 96 is a light spring of sufficient strength to maintain a cam surface on the crossbar 98 in abutting engagement with a cam surface 100 on the top panel 44. Thus, the spring 96 maintains the latch member 90 in the solid line position illustrated in FIGURE 3. As will be made clear hereinafter, when the top panel 44 assumes the phantom position illustrated in FIGURE 3, the cart 12 has partially entered the housing 14. At this point, the cam surface 100 causes the latch member 90 to assume the phantom position in FIGURE 3 so that the crossbar 98 has one end disposed behind the lip 102 on the housing 14. In FIGURE 3, the arrow illustrates the direction in which the cart 12 moves when it is entering the housing 14.

The cart 12 is mounted on wheels 104. Adjacent the access opening of the housing 14, a pair of guide rails 106 are provided on the floor of the housing. The guide rails 106 cooperate with the base side rails 40 to be sure that the cart 12 properly enters the housing 14. Once the entry of the cart 12 into the housing 14 is properly initiated, the movement between the supports 46 and the support channels 62 precludes cocking of the cart 12 relative to the housing 14.

Figure 9:
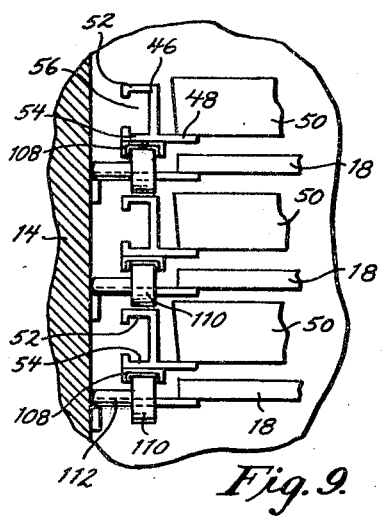
FIGURE 9 is an enlarged sectional view illustrating the manner in which the trays will be supported within the chamber.

As shown more clearly in FIGURES 4 and 9, a C-shaped bearing is provided on the lowermost surface of each of the supports 46. The underside of the supports 46 are provided with a stainless steel guide shoe 108. The shoes 108 roll on and are supported by rollers 110. The rollers 110 are rotatably supported on shafts 112 extending from the inner surface of the side walls of the housing 14. Thus, as the free ends of the cantilever supports 46 are relieved from the influence of the support exerted thereon by the support channel 62, the supports 46 become supported by the rollers 110.

When the cart 12 has been entirely introduced into the housing 14, the support channels 62 are in abutting engagement with the lip 102 and juxtaposed to the standards 36 and 38. In such disposition, the support channels 62 are in abutting engagement with limit stops 114. A limit stop, not shown, is provided on the forward end of the base side rails 40 and 42 to limit the extent of movement of the support channels in a direction away from the standards 36 and 38.

The operation of the present invention is as follows:

The cart 12, with the support channels 62 in the disposition illustrated in FIGURE 1, may be loaded with articles at any convenient point. Such convenient point may be remote from the enclosure 10. Such articles may be plates, trays, sheets, etc. Such articles will be supported between the angle supports 46 on the flanges 48. For purposes of illustration, it will be assumed that the articles are trays 50 as shown in the drawings.

The enclosure within which the cart 12 is adapted to enter, may be a freezer, a drier, a freeze drying housing, etc. For purposes of illustration, it will be assumed that the enclosure is the freeze drying housing 14. If the articles within the trays 50 are to be freeze dried, they are first placed within the trays 50. The cart 12 is then manually or mechanically moved and disposed within a freezer. Alternatively, the cart 12 may be loaded with trays 50 of frozen articles. In this case, the cart 12 will then be manually or mechanically moved so as to be disposed in front of the housing 14 as illustrated in FIGURE 1.

With the cart 12 disposed in front of the housing 14 as illustrated in FIGURE 1, it will be noted that the channel supports 62 are on the end of the cart 12 which is juxtaposed to the opening in the housing 14. Thereafter, the operator moves the cart 12 toward the opening of the housing 14. The guide rails 106 cooperate with the base side rails on the cart 12 to insure that the cart 12 properly enters the housing 14. It will be appreciated that any one of a wide variety of mechanisms may be provided to insure proper guidance of the cart 12 with respect to the housing 14.

As the cart 12 enters the housing 14, the righthand end of each plunger pin 82 in FIGURE 5 engages the front face of the housing 14. Engagement between the pins 82 and the housing 14 causes pins 82 to reciprocate to the left in FIGURE 5 and thereby compressing the spring 84 and sliding the pawl 86 along the base 66. In this regard, it will be noted that the abutting contact between the pawl 86 and the base 66 offers solid resistance to rotation of the shaft 72 in a clockwise direction in FIGURE 5. After the pawl 86 has been reciprocated for a short distance, the ratchet 88 and shaft 72 are free to rotate in a clockwise direction in FIGURE 5.

As soon as the shaft 72 is free to rotate, contact between the housing 14 and arms 70 causes the support channels 62 to reciprocate in a direction toward the standards 36 and 38. It may be necessary to provide pockets on the housing 14 to receive the ends of the pins 82 when arm 70 contacts housing 14. Such relative movement causes the cam surface 100 to bias crossbar 98 on the T-shaped latch member 90 to the phantom position in FIGURE 3 thereby compressing the spring 96. In order to accommodate the crossbar 98 on the latch member 90, the housing 14 may be provided with a slot through which the crossbar 98 enters while disposed in its solid line position in FIGURE 3. The crossbar 98 is maintained in its phantom position in FIGURE 3 by abutting engagement with the top panel 44 so long as the cart 12 is disposed within the housing 14.

The vertically disposed support channels 62 engage and interlock with the lip 102 as the cart 12 enters the housing 14 and the cart and shelf supporting mechanism is advanced into the housing 14. As the cart 12 enters the housing 14, the support channels 62 continue to reciprocate along the length of the supports 46. As the free end of the supports 46 move out of the influence of the support offered by the channels 62, the C-shaped shoes 108 on the lowermost surface of the supports 46 roll onto and are supported by the rollers 110. If desired, the bearings 108 may be made from a self-lubricating material and may slide onto a support on the side walls of the housing 14. Thus, it will be seen that the weight of the supports 46 and the trays thereon is transferred from the wheels 59 on the support channels 62 to the rollers 110 on the inner surface of the slide walls of the housing 14.

Figure 7:
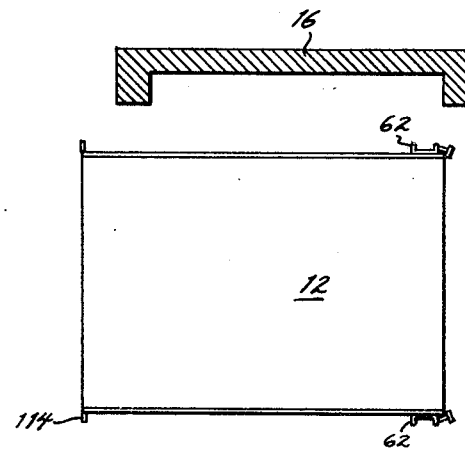
FIGURE 7 is a diagrammatic illustration of the chamber and cart prior to inserting the cart into the chamber.
Figure 8:
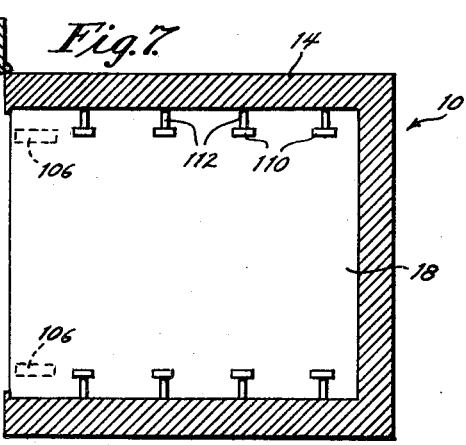
FIGURE 8 is a diagrammatic illustration of the relationship of the cart and oven when the cart is disposed therein.

The manner in which the cart 12 enters the housing 14 is shown more clearly in FIGURE 7. As shown in FIGURE 8, the support channels 62 have reciprocated to a disposition juxtaposed to the standards 36 and 38 when the cart 12 has fully entered the housing 14. Thereafter, the door 16 may be closed and the freeze drying process may commence thereafter. In the freeze drying process, the shelves 18 will be disposed between and spaced from adjacent layers of trays 50 as shown more clearly in FIGURE 9. The shelves 18 are each connected to the wires 20 and 22 and may be heated thereby. The shelves 18 may be a layer of electrically conductive material thereon, etc. Alternatively, it will be obvious that the shelves 18 may be hollow and connected to a source of heat such as steam.

The interior of the housing 14 will be evacuated by the pump 34. As the radiant heat from the shelves 18 at the reduced pressure causes the ice within the frozen articles to sublime, the resulting moisture from the sublimation of the ice is collected in the condenser 30.

After a predetermined period of time, the moisture content of the articles within the trays 50 will be reduced to approximately two to five percent thereby indicating that the freeze drying process has been completed. The method and/or apparatus for determining or indicating that the freeze drying process has been completed forms no part of the present invention. When the freeze drying process has been completed, the cart 12 and the articles supported thereon will be removed from the housing 14 so that the process may be repeated. In order to remove the cart 12, the cart 12 is manually or mechanically pulled out of the housing 14. As the cart 12 emerges from the housing 14, the engagement between the housing 14 and the crossbar 98 on the latch members 90 and 90′ causes the support channels 62 to remain stationary.

Since the support channels 62 are stationary as the cart 12 emerges from the housing 14, the shaft 72 on each channel support 62 will be rotating due to the engagement between the rack and gear mechanism. As the cart 12 emerges from the housing 14, the weight of the supports 46 and the trays 50 thereon is transferred from the rollers 110 to the wheels 58. As the cart 12 emerges from the housing 14, the presence of the cam surface 100 juxtaposed to one end of the crossbar 98 enables the spring 96 to expand thereby pivoting the latch members 90 and 90′ so that they clear the housing 14. At the same time, the springs for the plunger pins 82 will expand until the pawl 86 engages the teeth on the ratchet 88 thereby preventing further relative movement between the supports 46 and the channel supports 62.

Thereafter, the cart 12 may be manually or mechanically moved to an unloading location. When the cart 12 has been unloaded, it may be repetitively utilized in the above-mentioned cycle. While the explanation of the manner of use of the present invention describes the shelves 18 as being heater shelves, it will be obvious that the cart 12 may be utilized with an enclosure 10 in the form of a freezer. That is, the articles to be freeze dried are in a frozen state before being disposed within the evacuated freeze drying housing. Thus, the cart 12 will be inserted into a freezer and withdrawn therefrom in the same manner as described above before being disposed in and removed from the housing 14. It will be obvious to those skilled in the art that the cart 12 may be utilized with other types of enclosures having horizontally disposed shelves orientated so as to receive a tray or the like therebetween when the cart 12 is disposed within such enclosure.

Since the entire cart 12 and its contents enter the housing 14, it should be clear that a substantial amount of time is saved. That is, the necessity to load and unload articles onto the shelves of the housing 14 is eliminated by use of the cart 12. Since the cart 12 is mounted on wheels, it may be readily pushed about and utilized as a material handling apparatus during intermediate steps in the handling of the articles.

While the cart 12 eliminates the necessity for loading and unloading articles with respect to the shelves of the enclosure, the cart 12 has other advantages. Thus, the cart 12 permits the enclosure to be larger and deeper than those built heretofore. For example, a cart 12 having approximate dimensions of six feet wide, nine feet high and eight feet long has been constructed. It will be appreciated that an enclosure such as enclosure 10 having a depth of approximately eight feet presents problems when the shelves 18 are to be manually loaded and unloaded. In this regard, it will be noted that the distance between the various shelves 18 is only slightly greater than the height of the trays 50.

Thus, it will be seen that I have invented a novel material handling cart capable of being entirely disposed within an enclosure having a plurality of spaced parallel shelves with means for automatically latching and unlatching the cart with respect to the housing as the cart enters and leaves the housing.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising an enclosure having a plurality of shelves disposed in spaced horizontal planes one above the other, a portable cart adapted to enter said enclosure, said cart including a plurality of cantilever beams disposed in spaced horizontal planes, said beams being disposed so as to be between and spaced from juxtaposed shelves when said cart is disposed within said enclosure, a reciprocable channel support traversing said beams and interconnected therewith for reciprocation therealong, and means mounted in said enclosure for supporting the weight of said beams when said cart is disposed within said enclosure.

2. Apparatus in accordance with claim 1 including means for latching said cart with respect to said enclosure so that said reciprocable support moves along said beams as said cart emerges from said enclosure.

3. Apparatus comprising an enclosure having a plurality of spaced substantially parallel heaters, means associated with said heaters for varying the temperature of said heaters, said enclosure having an opening, a wheeled cart capable of having independent movement so that it may be loaded at a point remote from said enclosure, said cart being adapted to enter through said opening for disposition within said enclosure, said cart having a plurality of substantially parallel supports arranged in a manner so that the supports lie in plane offset with respect to the planes of the heaters so that said supports will be between heaters when said cart is disposed within said enclosure, said supports being cantilever beams, reciprocal means for supporting the free end of said supports when said cart is not disposed within said enclosure, abutment means on said enclosure for moving said reciprocal means away from the free ends of said supports as said cart enters said enclosure, and means in said enclosure for supporting and guiding the free ends of said supports when said cart is disposed within said enclosure.

4. Apparatus comprising an enclosure having an access opening, means for selectively closing said access opening, means for evacuating the interior of said enclosure, a plurality of horizontally disposed shelves within said enclosure, means for selectively heating said shelves, a discrete material handling cart adapted to enter said enclosure, spaced horizontally disposed cantilever beams on said cart for supporting articles, said beams being orientated so that articles will be supported thereby and between said shelves when said cart is disposed within said enclosure, a pair of reciprocable channel supports, said supports being on opposite sides of said beams, means structurally interrelating said supports with said beams so that the supports are mounted for selective reciprocation in unison along said beams as said cart enters said enclosure.

5. An enclosure having a plurality of spaced substantially parallel shelves, means associated with said shelves for varying the temperature of said shelves, a cart adapted to be disposed within said enclosure, said cart having a plurality of cantilever beams for supporting trays, said beams being orientated so that they will be disposed between the shelves when the cart is disposed within said enclosure, channel supports reciprocably mounted on opposite sides of the cantilever beams for engagement with and interlocking with a portion of said enclosure, and cooperating roller guide structure disposed within and supported by the enclosure for supporting and guiding the beams when the cart is disposed within said enclosure.

6. Apparatus comprising an enclosure having a plurality of horizontally disposed vertically spaced heater shelves disposed one above the other, means for electrically heating said shelves, a cart adapted to be disposed within said enclosure, said cart having a plurality of cantilever beams constituting tray supports, said beams being substantially parallel to one another and arranged so as to be disposed between the shelves when the cart is disposed within the enclosure, vertically disposed horizontally reciprocal channel supports mounted on opposite sides of a cart for engagement with an interlock with the enclosure whereby said channel supports are prevented from entering into said enclosure, said channel supports being reciprocably engaged with said cantilever beams for movement along a path substantially parallel to the longitudinal axis of said beams, and cooperating roller guide structure disposed on opposite sides of the interior walls of said enclosure for supporting the cantilever beams when the cart is disposed within said enclosure.

References Cited by the Examiner

UNITED STATES PATENTS

| | | | |
|---|---|---|---|
| 1,141,003 | 5/15 | Pombo et al. | 34—197 X |
| 1,328,398 | 1/20 | Rea et al. | 34—194 |
| 1,449,609 | 3/23 | Judelson | 312—317 X |
| 1,779,210 | 10/30 | Davis | 214—16.6 |
| 1,976,280 | 10/34 | Fischer | 34—164 |
| 2,024,386 | 12/35 | Phelps | 219—403 |
| 2,301,639 | 11/42 | Onstott | 214—515 |
| 2,362,117 | 11/44 | David | 34—92 |
| 2,376,457 | 5/45 | Skoog | 214—16.6 |
| 2,441,021 | 5/48 | Heineman | 34—92 |
| 2,820,559 | 1/58 | Armitage | 214—515 |
| 2,928,149 | 3/60 | Zifferer | 34—202 X |
| 3,135,589 | 6/64 | Stokes | 34—5 |

NORMAN YUDKOFF, *Primary Examiner.*

CHARLES O'CONNELL, *Examiner.*